United States Patent [19]
Hashimoto

[11] Patent Number: 5,320,200
[45] Date of Patent: Jun. 14, 1994

[54] FRICTION PAD WITH SHIM FOR USE IN DISC BRAKE

[75] Inventor: Junichi Hashimoto, Yamanashi, Japan

[73] Assignee: Tokico Ltd., Kanagawa, Japan

[21] Appl. No.: 31,993

[22] Filed: Mar. 16, 1993

[30] Foreign Application Priority Data

Mar. 17, 1992 [JP] Japan ............... 4-014234[U]

[51] Int. Cl.⁵ .................. F16D 65/08; F16D 55/00
[52] U.S. Cl. ................. 188/250 E; 188/250 B; 188/264 G; 29/413
[58] Field of Search .............. 188/73.1, 234, 250 B, 188/250 E, 258, 264 G; 29/412, 413, 414, 415, 417; 192/110 R

[56] References Cited

U.S. PATENT DOCUMENTS 4,995,482 2/1991 Kobayashi et al. ......... 188/264 GX

FOREIGN PATENT DOCUMENTS 177437 11/1982 Japan ..................... 188/234

OTHER PUBLICATIONS

Brake & Front End Magazine article, p. 17 by Herb Carrier Feb. 1986.

Primary Examiner—Douglas C. Butler
Assistant Examiner—Kevin D. Rutherford
Attorney, Agent, or Firm—Wenderoth, Lind & Ponack

[57] ABSTRACT

A friction pad includes a flat back plate, a friction member fixed to one surface of the back plate, a shim in the form of a thin plate attached to the other surface of the back plate, and a viscous fluid applied between the back plate and the shim. The shim is formed with semi-circular notches in the outer edge and inner edge thereof with respect to the radial direction of the disc, and the notch in the outer edge and the notch in the inner edge have the same curvature.

6 Claims, 4 Drawing Sheets

FRICTION PAD WITH SHIM FOR USE IN DISC BRAKE

BACKGROUND OF THE INVENTION

1. Field of the Invention

This invention relates to a friction pad for a disc brake to be used in a braking system of vehicles, such as automobiles, for example.

2. Prior Art

A disc brake usually includes a shim disposed between a pawl portion in a caliper and a pad and between a piston in the caliper and a pad, for the purpose of restricting noise in such a disc brake. The shim comprises a sheet attached to a back plate for the pads.

The shim is formed by blanking a continuous length of a web member. In order to facilitate feeding or advancement of the web member during manufacture of the shim, the web member is formed with pilot holes to accommodate feed pawls therein. Conventionally, such pilot holes are formed in the area of the web member from which the shim is formed. As will be explained in detail below, a viscous fluid substance, such as grease, may be interposed between the shim and a friction pad on which the shim is mounted, for the purpose of restricting noise in the disc brake. In such a case, a problem has been experienced in that the fluid leaks or flows through such pilot holes, when the pilot holes in the shim are disposed at or adjacent to the viscous fluid.

In order to avoid the above problem, the pilot holes are conventionally formed in a portion outside the area of the web corresponding to the shim, so that such portion including the pilot holes may be subsequently removed from the shim. It is noted, however, that such work disadvantageously requires an increased number of fabrication stages, as well as increased unnecessary or waste material.

SUMMARY OF THE INVENTION

The principal object of the invention is to provide a friction pad incorporating a shim which may be fabricated inexpensively as compared with a conventional shim having pilot holes and which may prevent leakage of a viscous fluid for increasing a noise restriction effect in the disc brake.

A friction pad according to the invention comprises a flat back plate, a friction member fixed to one surface of the back plate, a shim in the form of a thin plate attached to the other surface of the back plate, and a viscous fluid applied between the back plate and the shim. The shim is formed with semi-circular notches in the outer edge and inner edge thereof with respect to the radial direction of the disc, wherein the notch in the outer edge and the notch in the inner edge have the same curvature.

When the friction pad includes, in addition to the shim, a cover shim to cover the shim, the shim may be a conventional one, provided that the cover shim itself includes the above notches.

BRIEF DESCRIPTION OF THE DRAWINGS

For a better understanding of the invention, and to show how same may be effected, reference will be made, by way of example, to the accompanying drawings in which like reference numerals refer to like elements.

DETAILED DESCRIPTION OF THE PREFERRED EMBODIMENTS

The invention will be explained in detail below with reference to the accompanying drawings.

Figure 1:
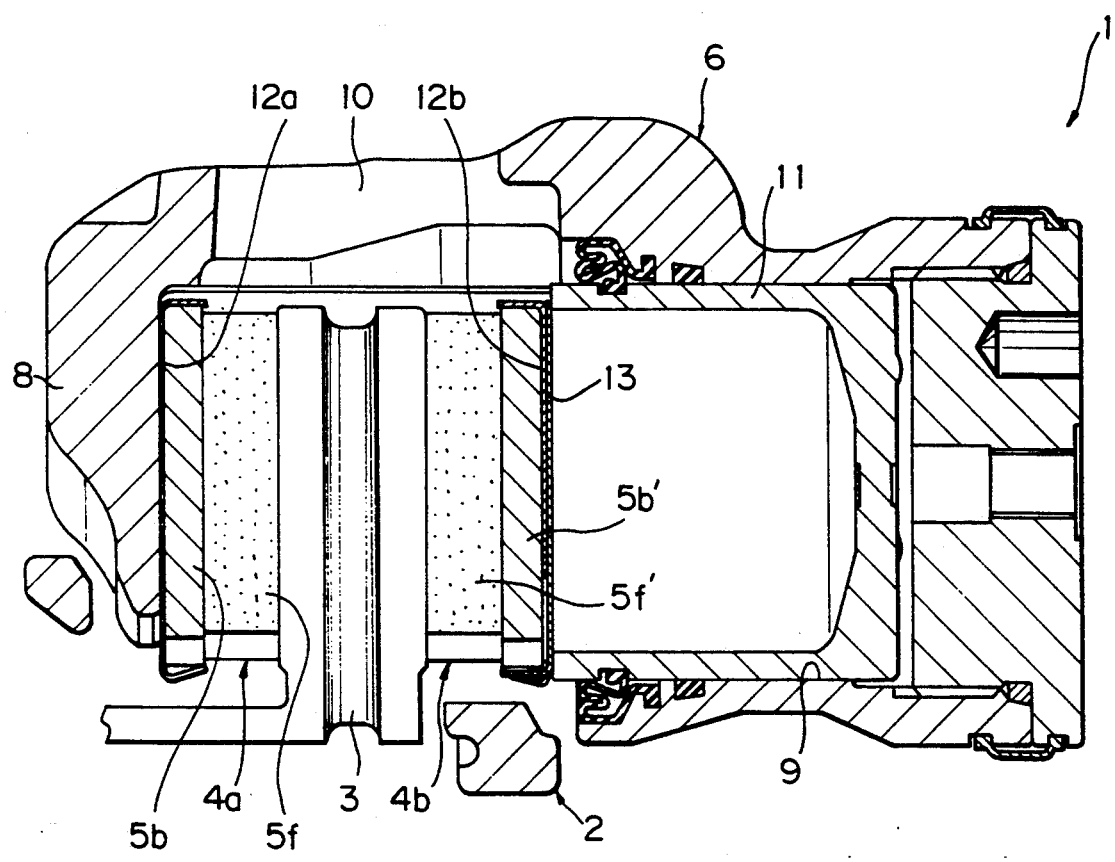
FIG. 1 is a side elevational view, in section, of a disc brake incorporating one embodiment of a friction pad in accordance with the invention.

FIG. 1 shows, in section, a disc brake 1 incorporating one embodiment of a friction pad according to the invention. The disc brake 1 includes, in part, a carrier 2 secured to a non-rotating portion of a vehicle, a pair of outer and inner pads 4a and 4b, respectively, disposed on the carrier 2 in a confronting relationship with the respective surfaces of the disc 3, and a caliper 6 supported by the carrier 2 for slidable movement along the axial or longitudinal direction of the disc 3. The pads 4a and 4b are supported by a pair of pad guides (not shown) for slidable movement along the axial direction of the disc 3. The pair of pad guides are mounted on the carrier so that the pad guides oppose each other. The caliper 6 includes a pawl portion (reactive portion) 8 extending along one side of the outer pad 4a remote from the disc 3, a cylinder portion 9 disposed on one side of the inner pad 4b remote from the disc 3, namely on the side remote from the pawl portion 8, and a connection portion 10 connecting the pawl portion 8 and the cylinder portion 9. A piston 11 is slidably received in the cylinder portion 9, the piston being of a cylindrical configuration with a closed bottom. Slidable movement of the piston 11 toward the pawl portion 8 causes the pads 4a and 4b between the piston 11 and the pawl portion 8 to be clamped in contact with the disc 3, thus applying a braking force to the vehicle.

The outer pad 4a includes a back plate 5b, and a friction member 5f fixed to the back plate. Similarly, the inner pad 4b includes a back plate 5b' and a friction member 5f'.

On one side of the outer pad 4a remote from the disc 3, there is provided an anti-scream shim 12a. The shim is interposed between the back plate 5b and the pawl portion 8 of the caliper 6. On one side of the inner pad 4b remote from the disc 3, there are provided an anti-scream shim 12b and a cover shim 13. The shim 12b and the cover shim 13 are interposed between the back plate 5b' and the piston 11, the shim 12b and the cover shim 13 being opposed to the inner pad 4b and the piston 11, respectively. The cover shim 13 is particularly provided so as to cover the piston-side shim 12b, which would otherwise have a reduced contact area with a force applicator (piston), for protection of the shim 12b.

Figure 2:
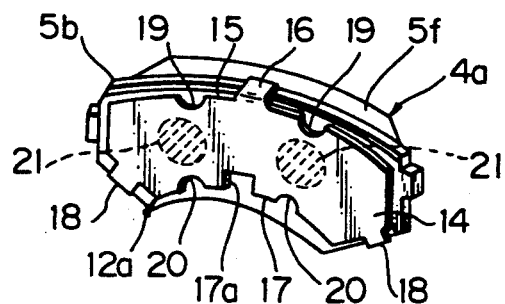
FIG. 2 is a perspective view of an outer friction pad in the disc brake of FIG. 1.

The shim 12a on the outer pad has a symmetrical configuration and comprises a stainless plate having elastomeric layers on opposite sides thereof as damping material. The shim 12a includes, as shown in FIG. 2, a base plate portion 14 covering one surface (front surface when viewed in FIG. 2) of the outer pad 4a remote from the disc 3, an outer restricting portion (tongue) 16 disposed at the radially (radially of the disc 3; to be used in the same sense below) outer edge 15 of the base plate portion 14 at the central portion thereof and extending toward the outer pad 4a, and two inner restricting portions (tongues) 18 extending from the radially inner edge 17 of the base plate portion 14 toward the outer pad 4a. Due to the resilient force of the outer restriction portion 16 and inner restriction portions 18, the shim 12a is restricted from moving in the radial and circumferential directions of the outer pad 4a, and axial direction of the disc 3 relative to the outer pad 4a. The outer edge 15 of the base plate portion 14 of the shim 12a has the same curvature as that of the central portion of the inner edge 17. The inner edge 17 is provided, at the central portion thereof, with a recess 17a having a width slightly greater than that of the outer restriction portion 16.

The friction pad of the invention is characterized by the configuration of the shim incorporated therein. In order to make this feature clear, a conventional shim will be explained below for illustrative purposes.

Figure 6:
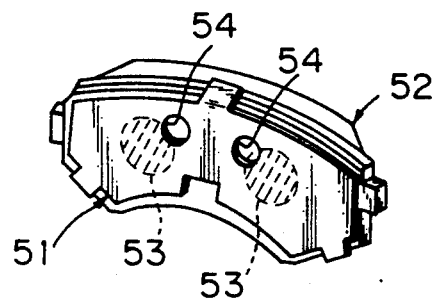
FIG. 6 is a perspective view of one example of pads incorporating a conventional shim.

In FIG. 6, a friction pad 52 of the same construction as that in FIG. 2 is shown. A shim 51 according to the prior art is mounted on a back plate of the illustrated friction pad. In order to increase the effect of restricting noise in the disc brake, a viscous fluid 53, such as grease, is applied to one surface of the pad 52 opposite to the shim 51.

The fluid is used in order to produce a damping effect against relative movement between the shim 51 and the pad 52 when the shim 51 is urged against the pad 52, and also to form an oil film between the shim 51 and the pad 52 for preventing direct, relatively slidable contact between the shim 51 and the pad 52.

Figure 7:
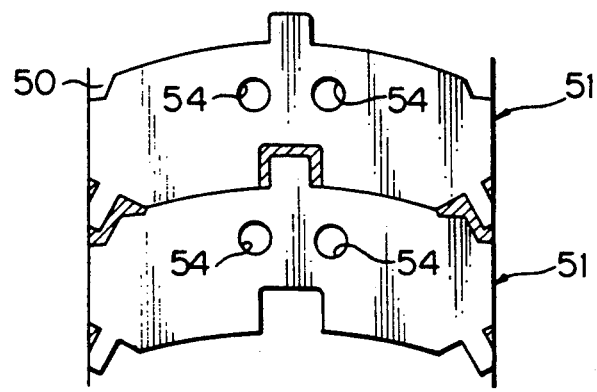
FIG. 7 is a plan view of conventional shims in a condition when they are punched.

The shim 51 is formed from a web member 50 of stainless steel plate or stainless plate having elastomeric layers on opposite surfaces thereof. As shown in FIG. 7, the web member 50 is blanked into an appropriate configuration by cutting out unnecessary portions (shaded portion in FIG. 7) thereof with a press machine.

It is noted, however, that the above method requires formation of pilot holes 54 in the web member 50 in order to feed or advance the web member 60. The pilot holes are arranged along the central portion of the web member. When the pawl portion includes two pawl members, the pilot holes are arranged substantially to correspond to the respective pawl members. When such shim 51 is used in the above disc brake, a problem has been experienced in that the viscous fluid applied to one surface of the pad 52 opposite to the shim 51, as shown in FIG. 6, flows out through the pilot holes 54, since, usually, the shim 51 is not fixed to the pawl portion or the piston.

Figure 8:
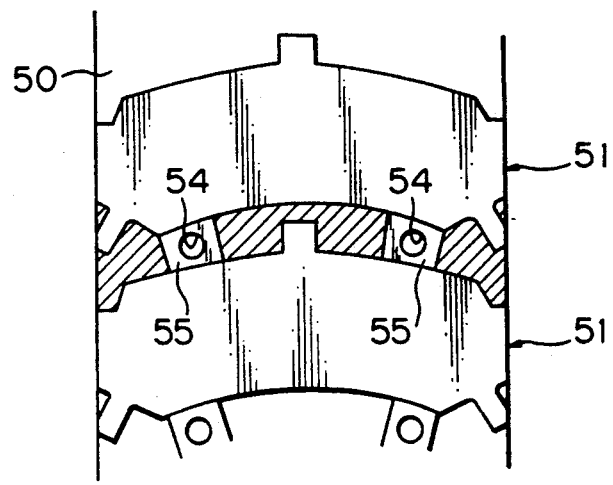
FIG. 8 is a plan view of another example of conventional shims in a condition when they are punched.
Figure 9:
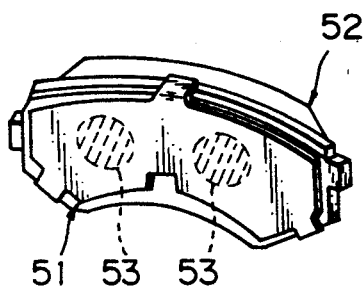
FIG. 9 is a perspective view of another example of pads incorporating a conventional shim.

In one method, in order to avoid the above problem, auxiliary portions 55 formed with the pilot holes 54 are arranged between each portion of the web member 50 from which the shim 51 is formed, as shown in FIG. 8, the auxiliary portions 55 being cut out later. The shim 51 produced in accordance with the above has no pilot 54 as shown in FIG. 9, so that leakage of a viscous fluid 53 applied to one surface of the pad 52 opposite to the shim 51 will be prevented. This causes a problem, however, in that the cost for producing such pads will be increased due to the increased area of unnecessary portions (shaded portions in FIG. 8).

In accordance with the invention, the shim 12a is provided with two outer, semi-circular notches 19 and two inner, semi-circular notches 20 in the outer edge 15 and inner edge 17, respectively, as shown in FIG. 2. The outer notches 19 and inner notches 20 are arranged in such a manner that the line connecting the right-hand notches 19 and 20 and the line connecting the left-hand notches 19 and 20 are parallel.

Two circular portions of a viscous fluid 21, such as grease, for increasing a scream restricting property are provided between the central portion of the base plate portion 14 and the pad 4a. Since the shim 12a is provided with outer, semi-circular notches 19 and inner, semi-circular notches 20 in the outer edge 15 and inner edge 17, respectively, the viscous fluid 21 applied between the shim and pad will not flow out, even when the shim 12a is displaced from the pawl portion 8 or piston 11. By this, the life of the fluid 21 will be prolonged. It is to be noted that, although the outer pad explained above is provided with two portions of the fluid, as shown in FIG. 2, since the pawl portion 8 is of a two-split configuration, the fluid may be applied over an increased area of the pad including the portion defined between the above two portions of the fluid.

Figure 3:
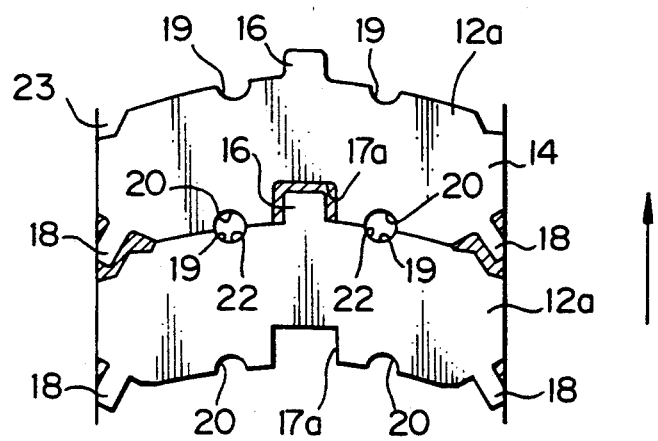
FIG. 3 is a plan view of shims which are to be incorporated in the friction pad according to the invention, the shims being shown in a condition when they are punched.

The shim 12a explained above is produced by blanking, by means of a press machine, a web member 23 consisting of a stainless steel plate having elastomeric layers as a damping material on opposite surfaces thereof, as shown in FIG. 3. The pilot holes 22 used for feeding the web during manufacture are constituted by the inner notches 20 of the shim 12a disposed forwardly in the direction of feeding (indicated by an arrow mark in FIG. 3) and the outer notches 19 of the shim 12a disposed rearwards in the direction of feeding. This makes it unnecessary to form pilot holes in the web member 23. By this, unnecessary portions of the web (shaded portions in FIG. 3) are minimized, thus restricting fabrication cost of the pads. It is also noted that the pilot holes 22 are formed in each boundary portion between adjacent shims 12a, which will subsequently be separated by a press machine. This advantageously contributes to easy blanking of the web.

The inner pad of the disc brake according to the invention will be explained below with reference to FIGS. 4 and 5.

Figure 4:
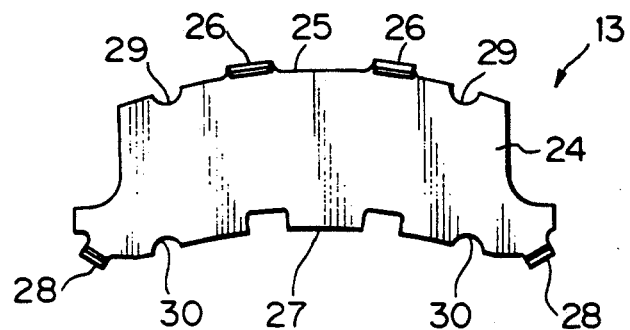
FIG. 4 is a front elevational view of a cover shim incorporated in the friction pad according to the invention.
Figure 5:
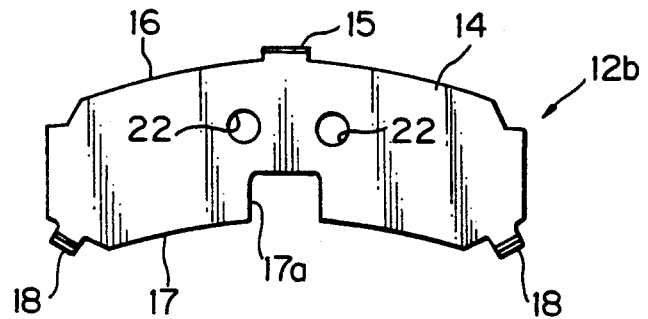
FIG. 5 is a front elevational view of a shim incorporated in the inner pad of the disc brake shown in FIG. 1.

As shown in FIG. 4, the cover shim 13 on the inner pad is formed from a stainless steel plate of a symmetrical configuration with respect to the vertical center line thereof. The cover shim 13 includes a base plate 24 covering one surface of the shim 12b remote from the disc 3, two outer restriction portions 26 formed at the outer edge 25 of the base plate 24 and extending from the outer edge 25 toward the disc 3, and two inner restriction portion 28 extending from the inner edge 27 of the base plate 24 toward the disc 3. The outer edge 25 of the base plate 24 on the cover shim 13 has a curvature the same as that of the central portion of the inner edge 27.

The shim 13 is provided with two outer, semi-circular notches 29 and two inner, semi-circular notches 30 in the outer edge 25 and inner edge 27, respectively. As shown in FIG. 4, the outer notches 29 and inner notches 30 are arranged in such a manner that the line connecting the right-hand notches 29 and 30 and the line connecting the left-hand notches 29 and 30 are parallel. As shown in FIG. 5, the shim 12b on the inner pad is substantially the same as a conventional one in that pilot holes 22 are formed in a base plate portion 14. The remaining portion is basically the same as the shim 12a of the outer pad.

Due to the above construction, the cover shim 13 is closely contacts the shim 12b so as to prevent any leakage of a viscous fluid 21 from the shim 12b. Thus, the life of the fluid 21 will be prolonged, as in the case of the shim 12a of the outer pad, regardless of the fact that pilot holes 22 are formed in the shim 12b in the central portion thereof. It is also noted that the cover shim 13 may be produced from a web member of a stainless steel plate in the same manner as the shim 12a of the outer pad. By this, unnecessary or waste portions will be minimized, thus restricting fabrication costs. Further, the pilot holes 22 are formed in the boundary portion between adjacent cover shims, which will be separated later. This advantageously contributes to easy blanking of the shim. It should be noted that the fluid may be applied not only between the shim 12b and the inner pad 4b, but also between the shim 12b and the cover shim 13.

As explained in detail above, the friction pad according to the invention includes a shim having semi-circular notches provided at the radially outer and inner portion of the shim. Thus, leakage of a viscous fluid, applied to one surface of the pad opposite to the shim, may advantageously be prevented. Further, pilot holes to be used for feeding the web material during manufacture are constituted by the notches formed in the inner edge of a shim forwardly in the direction of feeding and the notches formed in the outer edge of the following shim. This obviates the provision of auxiliary portions in the web member to be formed with such pilot holes, thus restricting manufacturing costs.

The principles, preferred embodiments and modes of operation of the present invention have been described in the foregoing specification. The invention should not, however, be construed as being limited only to the particular form described above which is to be regarded as illustrative rather than restrictive. Variations and modifications may be made by those skilled in the art without departing from the spirit of the present invention. Accordingly, the foregoing detailed description should be regarded as exemplary in nature and not as limiting the scope of the invention set forth in the appended claims.

What is claimed is:

1. A friction pad for use in a disk brake, said friction pad comprising: a flat back plate, a friction member fixed to one surface of the back plate, a shim in the form of a thin plate disposed over the other surface of and attached to said flat back plate, and a viscous fluid interposed between said flat back plate and said shim, the plate of said shim having opposite outer and inner edges which constitute radially outermost and radially innermost edges of the shim, respectively, with respect to the radial direction of a disk of the disk brake in which the friction pad is to be used, said shim having a pair of left-hand notches extending therein from said outer edge and said inner edge, respectively, and said shim having a pair of right-hand notches extending therein from said outer edge and said inner edge, respectively, and the outer edge of said shim having a profile complementary to that of the inner edge of said shim.

2. A friction pad for use in a disk brake as claimed in claim 1, wherein said shim comprises a metal plate, and an elastomeric material coating at least one surface of said metal plate.

3. A friction pad for use in a disk brake as claimed in claim 1, wherein a line passing through said left-hand notches and a line passing through said right-hand notches are parallel.

4. A friction pad for use in a disk brake, said friction pad comprising: a flat back plate, a friction member fixed to one surface of and attached to the back plate, a first shim in the form of a thin plate disposed over the other surface of and attached to said flat back plate, a cover shim in the form of a thin plate covering said first shim and attached to said back plate, and a viscous fluid provided at at least one of an area between said back plate and said first shim and an area between said first shim and said cover shim, the plate of said cover shim having opposite outer and inner edges which constitute radially outermost and radially innermost edges of the cover shim, respectively, with respect to the radial direction of a disk of the disk brake in which the friction pad is to be used, said cover shim having a pair of left-hand notches extending therein from said outer edge and said inner edge, respectively, and said cover shim having a pair of right-hand notches extending therein from said outer edge and said inner edge, respectively, and the outer edge of said cover shim having a profile complementary to that of the inner edge of said cover shim.

5. A friction pad for use in a disk brake as claimed in claim 4, wherein said cover shim comprises a metal plate, and an elastomeric material coating at least one surface of said metal plate.

6. A friction pad for use in a disk brake as claimed in claim 4, wherein a line passing through said left-hand notches and a line passing through said right-hand notches are parallel.

* * * * *